INVENTOR.
JOHN R. STEIGERWALD

BY
Oldham & Oldham
ATTORNEYS.

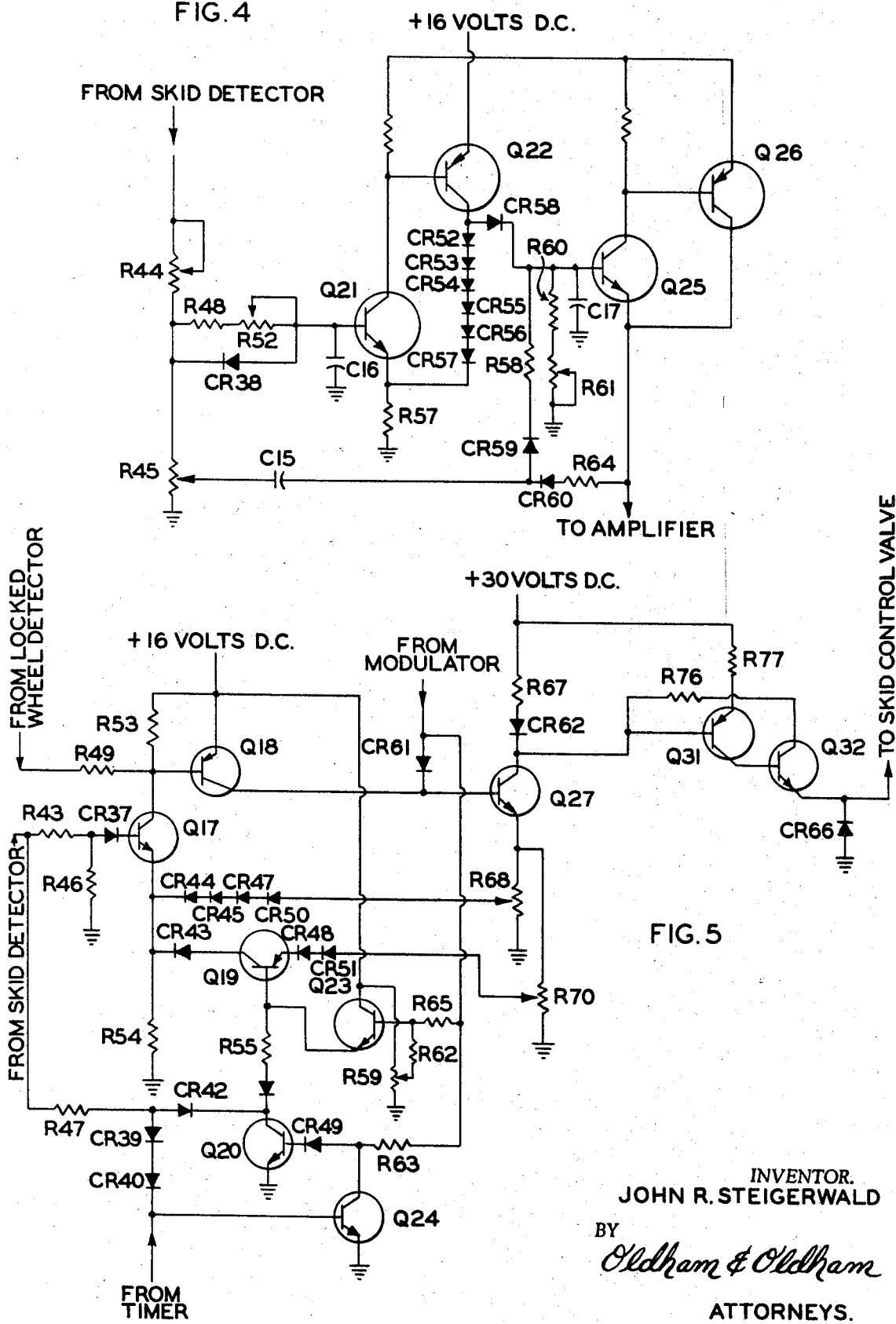

United States Patent Office 3,556,614
Patented Jan. 19, 1971

3,556,614
ANTISKID SYSTEM FEATURING BRAKE PRESSURE DUMP LIMITING AS A FUNCTION OF RUNWAY COEFFICIENT
John R. Steigerwald, Canton, Ohio, assignor to The Goodyear Tire & Rubber Company, Akron, Ohio, a corporation of Ohio
Filed Feb. 24, 1969, Ser. No. 801,367
Int. Cl. B60t 8/10
U.S. Cl. 303—21
6 Claims

ABSTRACT OF THE DISCLOSURE

This invention relates to a brake control system for vehicles, and more particularly to systems for vehicles having several independently rotatable load-bearing wheels each of which is equipped with a respective unit comprising a brake and a brake applying means. The particular characteristics of this invention are to apply skid control techniques utilizing a modulating voltage to gradually restore dumped pressure back to as near maximum pressure as possible without immediately creating another skid condition, and which unit more rapidly and accurately limits brake pressure dump as a function of runway coefficient. A control circuit is provided between the modulator and amplifier so that as the modulator level increases, it reduces the level of the feedback voltage within the amplifier so that more skid signal voltage is applied to the valve and the pressure dump is greater. On extremely low coefficient runway surfaces, the modulator signal level will be high, because the skid detector signals are wider, and practically full dump of the brake pressure will be allowed.

---

Heretofore it has been known that there are many and varied types of skid control systems, particularly adaptable to aircraft, and which are adapted to provide the greatest efficiency in braking action without losing control of the aircraft, and to provide shortest stopping distance possible. This invention is an improvement upon the type of antiskid system shown in U.S. Patent No. 3,245,727, and patent application Serial Number 593,150, filed Nov. 9, 1966, now abandoned, on Skid Control System.

Thus, it is the general object of the present invention to provide an improvement in the antiskid brake control art by the provisions of a unique control circuit between the modulator and amplifier which automatically adjusts the brake pressure dump level for the characteristics of the runway frictional coefficient to produce a more efficiently operating system, and one which provides greater reliability over a wider range of runway conditions.

The aforesaid object of the invention, and other objects which will become apparent as the description proceeds are achieved by providing an antiskid braking system which comprises a plurality of rotatable wheels, means to supply hydraulic braking pressure to each wheel, independent valve means to adjustably restrict the hydraulic pressure actually supplied to each wheel, means to represent the wheel rotation of each wheel as a DC voltage, a separate antiskid detection circuit for each wheel receiving the DC voltage representing wheel's speed, each detection circuit including a modulator to limit the return of dump pressure immediately to a wheel indicating a skid condition, and which includes a control circuit between the modulator and an amplifier to control the brake pressure dump level in accordance with the coefficient of friction on the runway surface as indicated by the skid detector signal.

Figure 1:
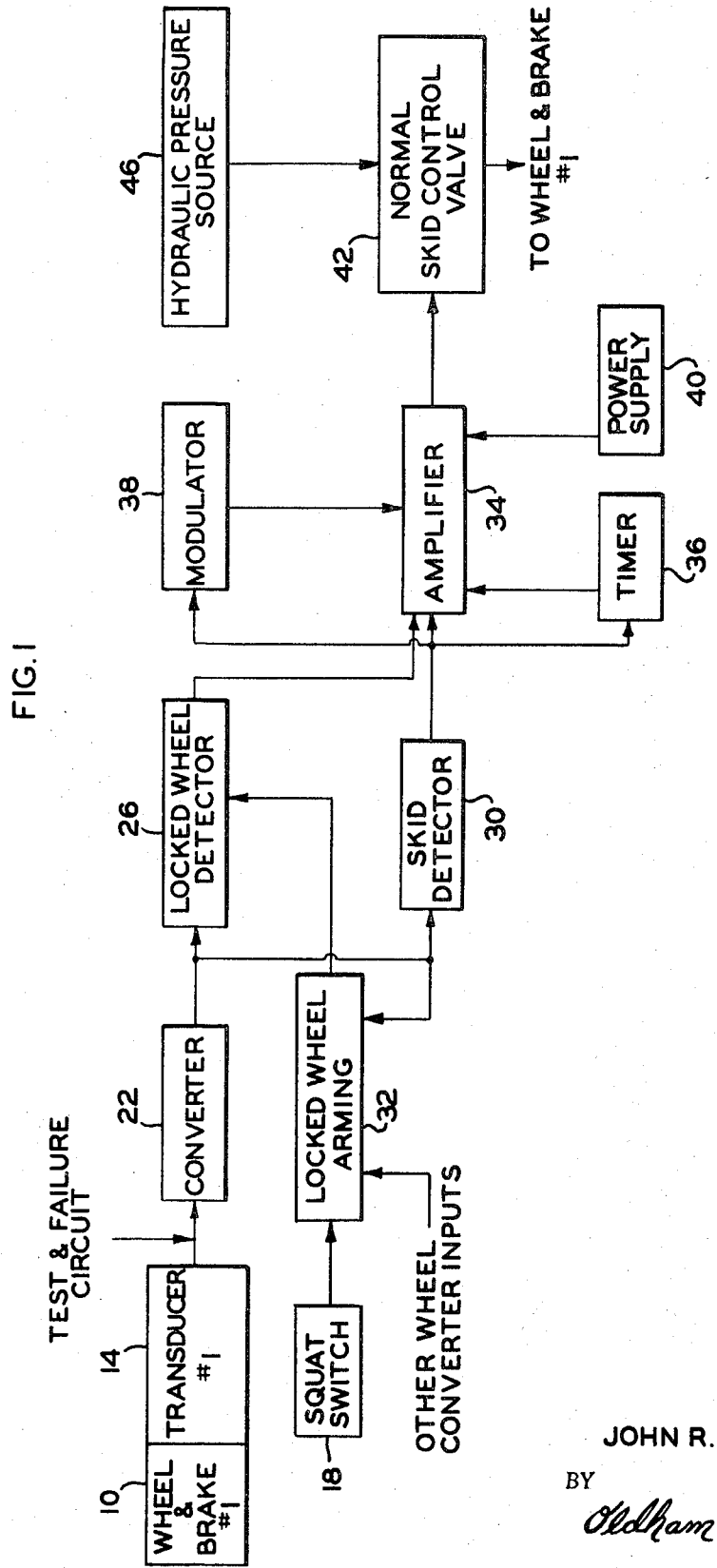
Figure 2:
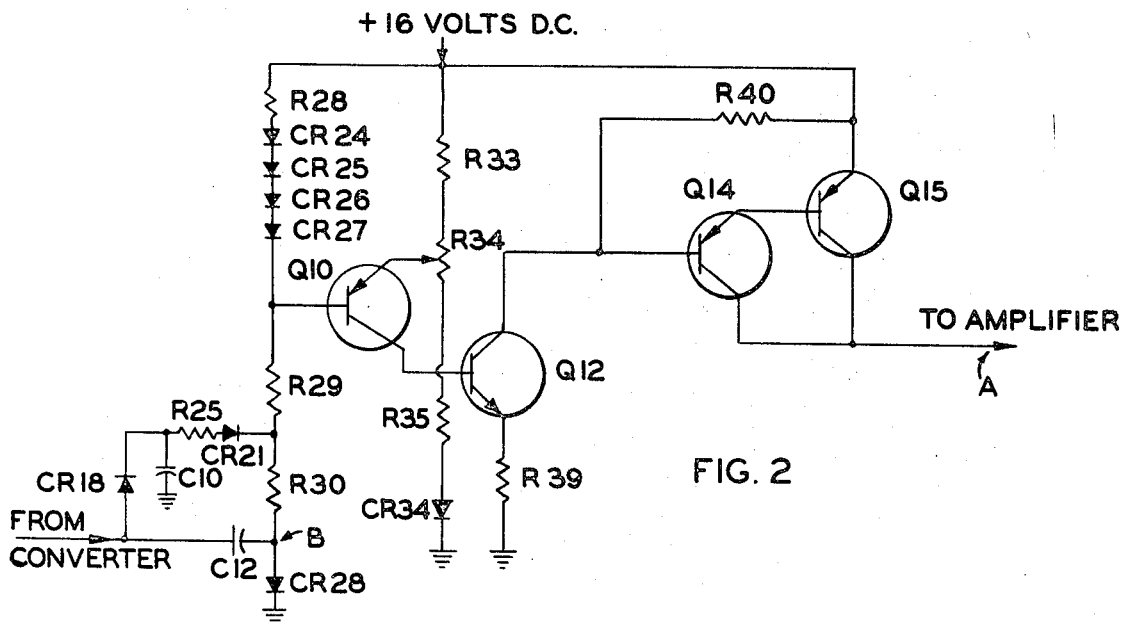
Figure 3:
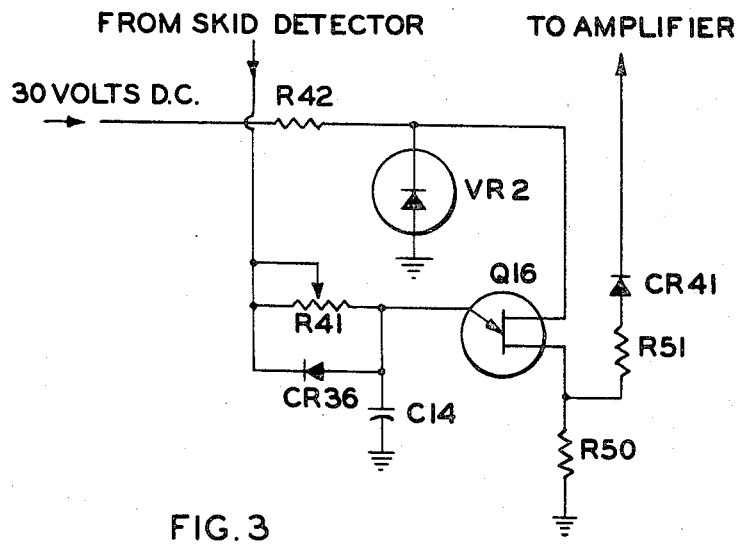

For better understanding of the invention reference should be had to the accompanying drawings wherein:

FIG. 1 is a block diagram schematic illustration of the essential, basic components to the circuit;
FIG. 2 is an electrical schematic of the basic circuit utilized in the skid detector;
FIG. 3 is an electrical schematic of the basic circuit utilized in the timer;
FIG. 4 is an electrical schematic of the basic circuit utilized in the modulator; and
FIG. 5 is an electrical schematic of the basic circuit utilized in the amplifier circuit.

With reference to the form of the invention illustrated in FIG. 1 of the drawings, the numeral 10 indicates wheel and brake unit number 1. The invention is applicable to any number of units, and to units where there may be one or more wheel and associated brake in tandem. Each unit has an associated transducer indicated by block 14. The output of each transducer feeds a respective converter circuit 22, all in the conventional manner, and sends a DC signal indicative of wheel rotational speed simultaneously to a locked wheel detector 26 and to a skid detector indicated by block 30. The squat switch 18 feeds a common locked wheel arming circuit 32. All the components described heretofore are conventional in substantially any antiskid system, and their operation to produce output signals from detector 30 is understood by anyone skilled in the art.

The electrical signals from skid detector 30 feed to an amplifier 34 which is controlled in operation by a timer 36, and a modulator 38. Power is supplied to the amplifier 34 from a suitable power source 40. The output of the amplifier 34 controls a skid control valve 42 which in turn is supplied from a hydraulic pressure source 46 and sends hydraulic pressure in a controlled manner to the wheel and brake unit 10, all in a manner well understood by those skilled in the art.

SKID DETECTOR

The skid detector which is shown in schematic form in FIG. 2 contains a detector section which feeds output point A. A transistor Q10 is normally non-conductive because a control resistor R34 is set to a point which is slightly below the point of conduction for Q10. The diode string consisting of CR24, CR25, CR26 and CR27 provides temperature compensation so that the turn-on point for Q10 remains stable throughout the temperature range of $-65°$ F. to $160°$ F.

Capacitor C12 is charged to the DC output voltage of its respective converter. Diode CR28 provides a low impedance charge path so that capacitor C12 can be charged immediately upon wheel spin-up at touchdown and so that it can be quickly recharged upon recovery from a skid.

After touchdown, if no skid occurs and the aircraft gradually slows down, the DC output of the converter will gradually decrease and C12 will gradually discharge. The discharge current will be taken away from the steady state current that normally goes through CR28. Q10 will remain nonconductive as long as no skid occurs.

When a skid (a rapid loss in wheel speed) occurs, the DC output from the converter drops a proportional amount. The drop in converter output increases the discharge rate of C12 and thus causes point B to become sufficiently negative to cause Q10 to conduct. Conduction by Q10 causes conduction of transistors Q12, Q14 and Q15. The collector of Q15 sends a voltage to the amplifier 34 which in turn sends a control signal to the respective valve 42. The Q15 collector voltage is also sent to the modulator 38 and timer 36 which circuits will be explained in more detail later.

The network consisting of diodes CR18, CR21, capacitor C10 and resistor R25 provides a means for varying the threshold sensitivity of the skid detector circuit in proportion to aircraft speed. The DC output from the respective converter is applied through this network to the base of Q10 where it changes the reverse bias voltage level for Q10. The skid detector has an initial threshold setting of 3.5 miles per hour wheel speed deviation. As the aircraft speed increases above 35 m.p.h., the wheel speed deviation threshold is increased proportionally and maintained between 5 to 10 percent of the nominal speed.

The capacitor C10 maintains the aircraft speed reference during wheel speed deviations.

AMPLIFIER

The amplifier which is shown in schematic form in FIG. skid detector 30, the locked wheel detector 26, and the modulator 38 so that they will be strong enough to operate the control valve 42. Each signal from the skid detector is of the same amplitude regardless of the magnitude of the skid, with this magnitude being controlled by the circuit characteristics of the skid detector.

The amplifier which is shown in schematic form in FIG. 5 takes the signal from the skid detector and applies it to the base of transistor Q17 which then turns on transistor Q18, Q27, Q31, and Q32 thus sending a dump signal to the valve 42.

Transistors Q31 and Q32 together with associated components form a current control circuit for operating the valve. The current this circuit sends to the valve is determined by the voltage developed across resistors R68 and R70 and is limited to a value just over full pressure dump. By using current control for valve operation, the system performance is not effected by valve coil resistance change at extreme temperatures.

One of the features of the invention is provided by two feedback circuits which are used from the emitter of transistor Q27 to the emitter of transistor Q17. These limit the amplitude of all dump signals initiated by the skid detector 30 so that brake pressure is not dumped entirely, but is dumped instead only to the level that will allow wheel recovery from the impending skid. Limiting the pressure dump cuts to a minimum the amount of fluid that is dumped from the brake during the correction of a skid and thus minimizes reapplication time because very little fluid is used in the brake after the initial quantity required to take up the clearance when brakes are first applied by pilot.

Whenever a skid occurs, the skid detector voltage signal is applied through the divider network R43 and R46 to the base of transistor Q17. The voltage which then appears at the emitter of Q17 is developed by the same current that turns on transistor Q18. The resulting dump signal by transistor Q27 causes a voltage to be developed at the arm of resistors R68 and R70 which is fed back through a series of diodes CR43, CR44, CR45, CR47, CR48, and CR50 and CR51, and transistor Q19 in two separate paths as clearly shown in FIG. 5 to the emitter of Q17. The diode strings are used to provide temperature compensation, thus ensuring that the dump signal to the valve will be of the proper amplitude regardless of the ambient temperature of the control unit. The settings of R68 and R70 have no effect on the signals from the locked wheel detector or the modulator.

One of the feedback signals in the amplifier is controlled by transistor Q19 and its associated circuitry. A voltage signal from the modulator is applied through resistor R65 and transistor Q23 to the base of Q19 to provide this control. As the modulator signal level increases, it reduces the level of the feedback voltage between R70 and R54. With reduced feedback in the amplifier, more skid signal voltage is now applied to the valve and the pressure dump is greater. On extremely low coefficient runway surfaces, the modulator signal level will be high, because the skid detector signals are wider, and practically full dump of the brake pressure will be allowed.

The operation of transistor Q19 is also controlled by Q20 and Q24. These transistors are capable of switching Q19 off under certain conditions when limiting the pressure dump is not desired. One of these conditions is during the first skid cycle before the modulator voltage level has been set. Prior to the first skid cycle Q20 and Q24 are not conducting. At the start of the first skid cycle, Q15 is switched on as described above. This applies a fixed voltage level to R47. Current flow through R47, CR39 and CR40 causes Q24 to conduct and short out the base of Q20. This opens the ground path for the base of Q19, which cuts off the one amplifier feedback signal. The valve then receeivs a full dump signal which is limited to the lining and disc contact pressure of the brake. This dump level is set by the feedback network R68, CR44, CR45, CR47 and CR50. After the first skid cycle is corrected, the Q15 collector voltage drops to zero and Q24 cuts off. Q20 will then conduct due to base current through R63 and CR49 from the modulator signal. With Q20 conducting Q19 is able to control the amplifier feedback and any further skid signals from R47 are bypassed to ground through CR42 and Q20.

R59 is used to set a break point on the normal skid dump level curve. CR66 suppresses any inductive transients that occur in the coil of the valve.

TIMER

The timer circuit which is shown in schematic form in FIG. 3 consists of Q16 and associated electrical components. The circuit monitors the width of the signal from the skid detector 30. If the duration of this pulse exceeds approximately 0.1 second, Q16 sends a pulse of current through resistor R51 and diodes CR41 to cause conduction of Q24. This stops conduction of Q19 and Q20 and allows a full dump pressure. The action of this circuit comes into use when a rapid coefficient change occurs on the runway which requires an immediate large dump in pressure.

MODULATOR

The purpose of the modulator which is shown in schematic form in FIG. 2, is to control the manner in which brake pressure is reapplied following a skid. After a skid has occurred, the pressure must be reapplied quickly, but it must be somewhat lower than the pressure that caused the skid; and after application, the pressure must climb slowly. The modulator finds the proper operating level during the first skid rather than having to go through a series of skids before reaching that level.

The main requirements of the modulator are:

(1) As soon as brakes are applied by the pilot, modulation must quickly reach the proper level regardless of runway conditions.

(2) Following each skid, the modulator must control the valve so that brake pressure is quickly reapplied at a level slightly lower than that which caused the skid, and then it must cause a gradual increase in pressure so as to cause another skid.

Each time a skid occurs, the skid detector signal is applied to the modulator. C16 then begins to charge through R44, R48 and R52, but the time constant is such that C16 does not become fully charged. The actual charge reached depends upon the time duration of the skid.

When the skid has been corrected, the skid detector signal disappears. C16 then quickly discharges through CR38 and R45 so that with each new skid the charging of C16 begins with no leftover charge from the previous skid. During the charging of C16, a corresponding voltage is developed across R57 by Q21 and Q22 which act as an emitter follower for the voltage on C16. However, the voltage at the collector of Q22 is higher than the voltage at the emitter of Q21 because of the voltage drop across the six diodes CR52 to CR57. The voltage at the collector of Q22 is applied through CR58 to C17. The voltage of C17 is the modulator voltage which is applied to the valve between skids. The current required by the valve is too great to be supplied directly by C17; therefore, Q25 and Q26 are used to provide current amplification.

The diodes, CR52 to CR57, are used to provide temperature compensation so that the voltage of C17 will be as required to provide the proper valve voltage throughout the required temperature range. As the temperature goes down, the voltage loss over Q25, CR61, and the semi-conductors in the amplifier goes up which would result in a lower valve voltage if the voltage of C17 were not boosted by the compensating action of the diodes, CR52 to CR57.

The operation just described covers one of the two branches of the modulator. That branch enables the modulator voltage to reach the proper operating level on the first cycle of antiskid action, and also provides a rapid increase in the modulator voltage if the aircraft encounters a sudden drop in runway coefficient.

The second branch of the modulator provides a constant amplitude low-level pulse for adding to the charge of C17 because many skids are too short to provide added charge of C17 through the R48, C16, Q21, etc. branch. The amplitude of this pulse is established by the setting to R45. Between skids, C15 becomes charged to approximately the voltage of C17 because between skids the voltage at the emitter of Q25 is established by the voltage of C17, and the time constant of R64–C15–R45 is comparatively short. The start of each new skid therefore finds C15 charged to almost the same voltage as C17. The pulse which is developed at the arm of R45 during the skid adds to the voltage of C15 and thereby causes C17 to receive added charge through CR59 and R58.

CR58 and CR59 prevent discharge of C17 through undesired paths. CR60 prevents loss of the constant amplitude pulses through R64 and the amplifier. R60 and R61 establish the discharge rate of C17 and therefore establish the rate of increase of brake pressure between skids. The voltage that exists on C17 after a skid establishes the level at which brake pressure will be reapplied after the skid. The setting of R44 establishes the maximum voltage to which C16 (and C17) can climb as the result of an abnormally long skid during which C16 might become fully charged.

What is claimed is:
1. An antiskid system which comprises
at least one rotatable wheel,
brake means for the wheel,
means to represent wheel rotation as a DC voltage,
a skid detector receiving the DC voltage and sensing sudden fluctuations thereof indicating skid conditions and providing signal outputs thereof,
an amplifier receiving the signals of the skid detector to increase the strength thereof, which includes a feedback circuit within the amplifier to limit the amplitude of signals to the control valve, and
a skid control valve actuated by the signals from the amplifier to control actuation of the brake means for the wheel.

2. An antiskid system according to claim 1 which includes a modulator acting upon the amplifier to limit the return of actuation to the brake means to slightly less pressure than was applied to cause the skid condition, and which includes a transistor in the feedback is proportionally controlled by the modulator signal.

3. An antiskid system according to claim 1 which includes a timer that measures the time duration of the signals from the skid detector, and applies a full dump signal to the skid control valve if the duration of the signal from the skid detector exceeds .1 second.

4. An antiskid system according to claim 3 which includes temperature compensating diodes in the feedback circuit.

5. An antiskid system according to claim 2 which includes two separate feedback circuits, one to limit the maximum output signal from the amplifier, and the other acted upon by the modulator, but both acting upon the output signal of the amplifier.

6. An antiskid braking system which comprises a plurality of rotatable wheels, means to supply hydraulic braking pressure to each wheel, valve means to adjustably restrict the hydraulic pressure actually supplied to each wheel, means to represent the wheel rotation of each wheel as a DC voltage, amplifier means to amplify the DC voltage, a separate antiskid detection circuit for each wheel receiving the DC voltage representing wheel's speed, each detection circuit including a modulator to limit the return of dump pressure immediately to a wheel indicating a skid condition, and which includes a control circuit between the modulator and the amplifier means to control the brake pressure dump level in accordance with the coefficient of friction on the runway surface as indicated by the skid signal.

References Cited

UNITED STATES PATENTS

| | | | |
|---|---|---|---|
| 2,980,369 | 4/1961 | Ruof | 303—21UX |
| 3,245,727 | 4/1966 | Anderson et al. | 303—21 |

MILTON BUCHLER, Primary Examiner

J. J. McLAUGHLIN, Jr., Assistant Examiner

U.S. Cl. X.R.

188—181